Aug. 2, 1932.　　　　　A. DINA　　　　　1,869,888
LOCKING AND CLAMPING MECHANISM FOR MOTION
PICTURE PROJECTOR MACHINE PARTS
Filed March 1, 1930　　　3 Sheets-Sheet 2

INVENTOR
Augusto Dina
BY
Howard W. Dix
ATTORNEY

Aug. 2, 1932.  A. DINA  1,869,888
LOCKING AND CLAMPING MECHANISM FOR MOTION
PICTURE PROJECTOR MACHINE PARTS
Filed March 1, 1930  3 Sheets-Sheet 3

INVENTOR
Augusto Dina
BY
Howard W. Dix
ATTORNEY

Patented Aug. 2, 1932

1,869,888

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

LOCKING AND CLAMPING MECHANISM FOR MOTION PICTURE PROJECTOR MACHINE PARTS

Application filed March 1, 1930. Serial No. 432,310.

This invention relates to adjustable supports, and more particularly to an adjustable support for a motion picture projection machine, and to a new and improved clamping means therefor.

An object of the invention is to provide a clamping means which is capable of maintaining the projection head in a rigid position and substantially eliminating vibrations which tend to be produced by the moving parts.

Another object of the invention is to provide an adjustment for the pedestal lever of a projection machine which is capable of controlling the line of projection and which may be readily clamped to maintain the line of projection in the desired position.

A further object is to provide a clamping means for an adjustable support in which the adjustable element of the support is clamped to the stationary element at a plurality of points located on opposite sides of the pivot point.

Another object of the invention is to provide a cheap, simple, dependable and highly efficient device of the class above indicated.

The above objects and others which will be apparent as the nature of the invention is disclosed are accomplished by mounting the movable element, as for example, the frame of a projection machine about an axis passing through the center of mechanical disturbance as more fully discussed in my copending application, Serial No. 410,829 filed November 30, 1929, for motion picture projector machine structures. The frame is extended above and below the pivot point and clamping means are provided at both the top and bottom for securing it to the supporting pedestal at those points. One of the clamping means has adjusting mechanism associated therewith whereby the angular relation between the frame and pedestal may be accurately controlled.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of the supporting mechanism for a projection machine constructed in accordance with the present invention;

Like reference characters denote like parts in the several figures of the drawings.

Figure 1:
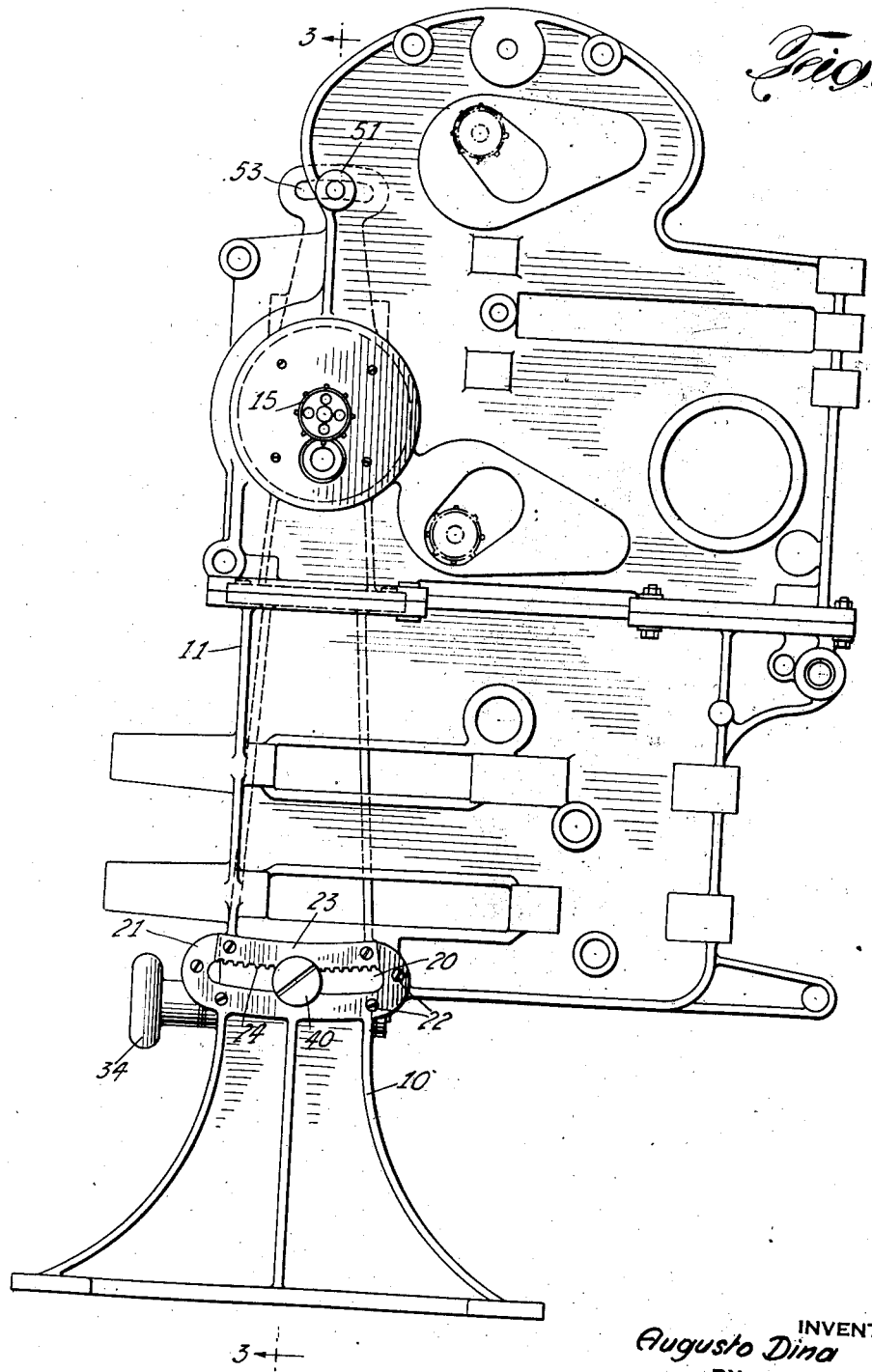
Figures 2, 3:
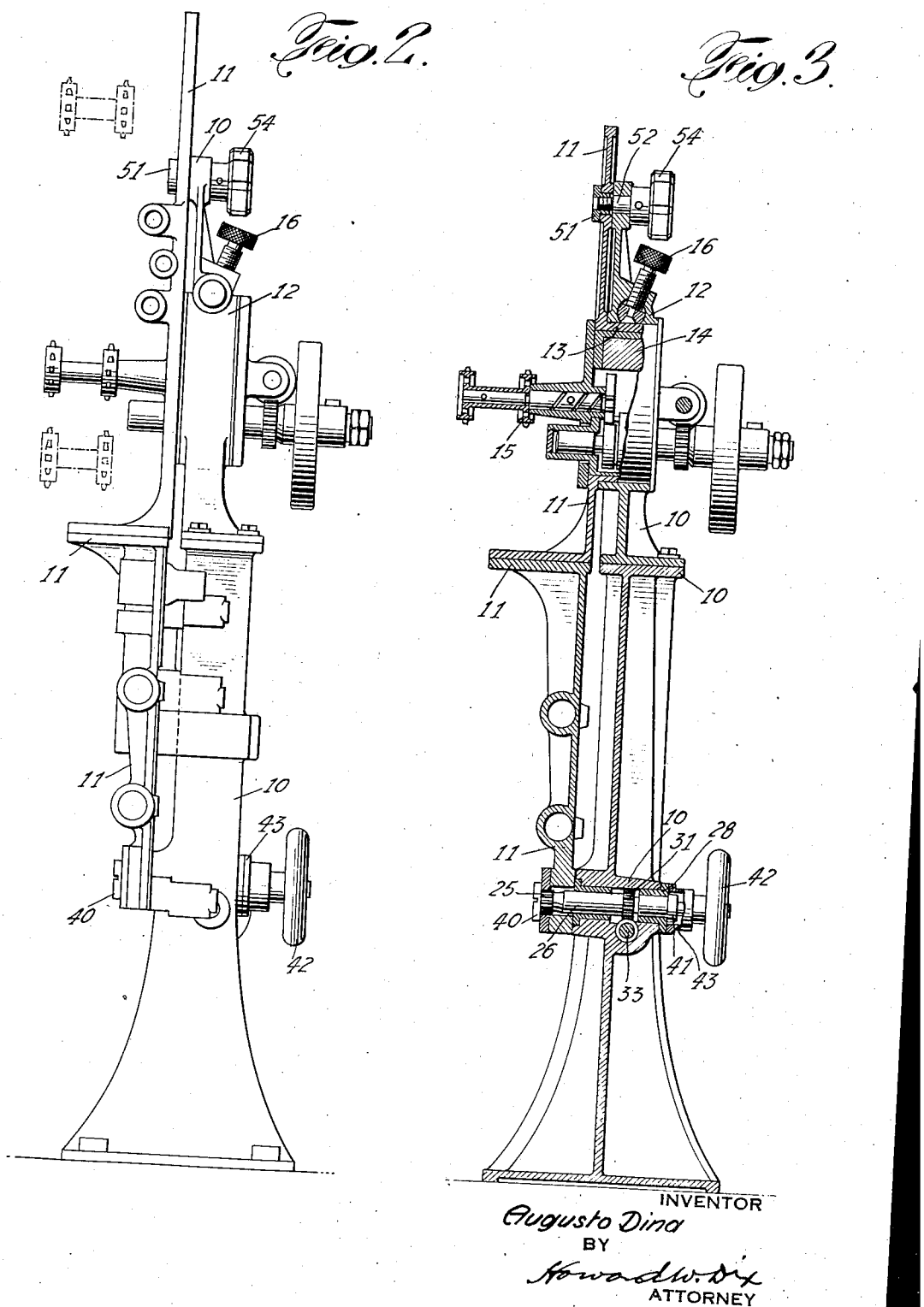
Fig. 2 is an end elevation thereof.
Fig. 3 is a section taken on the line 3—3 of Fig. 1.
Figure 4:
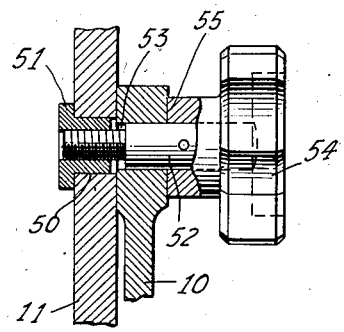
Fig. 4 is an enlarged sectional view of the upper clamp.
Figure 5:
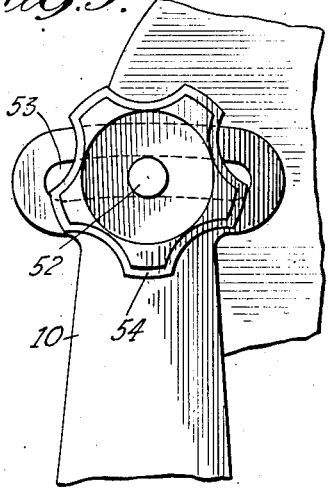
Fig. 5 is a side elevation thereof.
Figure 6:
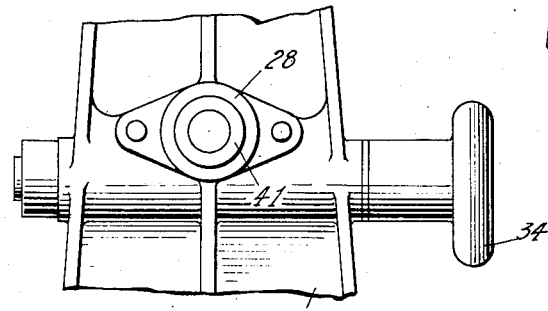
Fig. 6 is a side elevation of the lower clamping means.

In the following description and in the claims parts will be identified by specific names for convenience, but they are intended to be as generic in their application to similar parts as the art will permit.

Referring to the drawings more in detail the invention is shown as applied to a support for a projection machine comprising a pedestal 10 having a frame 11 pivotally mounted thereon. Pedestal 10 is provided with an enlarged boss 12 which is recessed to receive annular member 13 which is formed in frame 11. Annular member 13 is also recessed to receive any desired operating mechanism, as for example, the Geneva gear housing 14 and the operating mechanism for the intermittent sprocket 15. The arrangement is such that frame 11 is journalled in pedestal 10 about the axis of the intermittent sprocket. Suitable lubricating means, such as grease cup 16, are provided for applying oil or other lubricant to the bearing between the frame and the pedestal.

Figure 8:
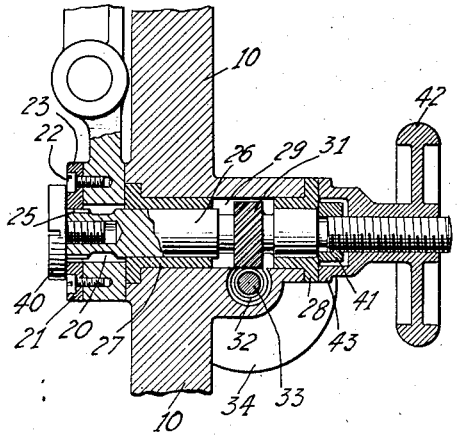
Fig. 8 is a sectional view showing the lower clamping and adjusting mechanism.

For adjusting the angular position of frame 11, the frame is provided with an arcuate slot 20 in the lower portion thereof (Fig. 8). A facing member 21 having a similar arcuate slot is secured to frame 11 by screws 22 and is provided with a rack 23 having teeth 24 extending into said slot.

Figure 7:
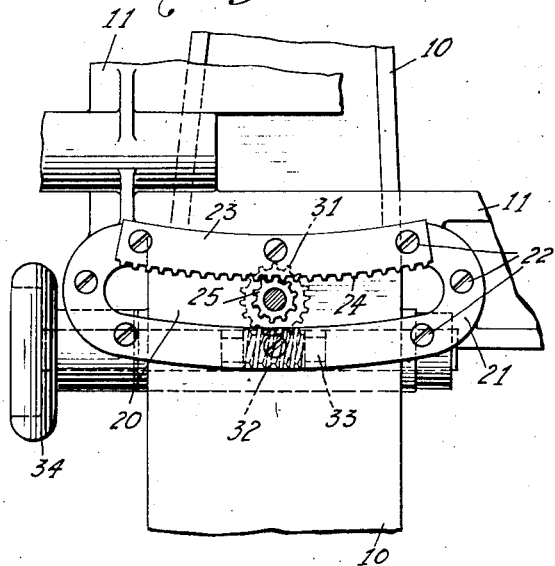
Fig. 7 is an enlarged detailed view thereof.

Cooperating with teeth 24 of rack 23 is a gear wheel 25 which is associated with shaft 26 as by being formed directly thereon or secured thereto in any convenient manner. Shaft 26 is journalled in bushings 27 and 28 which are held within bore 29 of pedestal 10. Gear wheel 31 is secured on shaft 26 and cooperates with worm wheel 32 which is carried on shaft 33 (Fig. 7). Shaft 33 is journalled in suitable bearings in pedestal 10 and is operated by hand wheel 34.

Screw 40, having an enlarged head, is threaded in the end of shaft 26 and serves as a shoulder to prevent longitudinal movement of said shaft in one direction. Nut 41 is threaded on the other end of shaft 26 and bears against bushing 28 to prevent longitudinal movement of shaft 26 in the other direction. Clamping wheel 42 is threaded on shaft 26 and is provided with a collar 43 which is adapted to engage bushing 28 and force the same into engagement with the stationary casing for clamping purposes.

The upper portion of frame 11 is provided with a bore 50 in which bushing 51 is seated. Shaft 52 is threaded in bushing 51 and extends through an arcuate slot 53 in the upper portion of pedestal 10. Hand wheel 54 is pinned to shaft 52 and has a shoulder 55 which is adapted to engage the face of pedestal 10 adjacent arcuate slot 53 for clamping purposes. Wheel 54 may have a knurled surface which may be of non-circular contour to permit the same to be readily grasped by the hand.

In the operation of the above device, frame 11 is pivotally movable about the annular member 13 which is journalled in boss 12 of pedestal 10. When the frame is to be adjusted, hand wheel 34 is operated to rotate shaft 26 and gear 25, thereby causing movement of rack 23. When the desired position has been obtained, the hand wheel 42 may be tightened, thereby clamping shaft 26 and bushing 28 against the pedestal and preventing further pivotal movement of frame 11. Hand wheel 54 may then be tightened for clamping the upper portion of pedestal 10 to the upper portion of frame 11 and thereby effecting a particularly rigid assembly.

It is to be noted that the two clamping means are mounted at diametrically opposite positions with respect to the pivot point of the frame and that they are mounted a maximum distance from said pivot point. By locating the clamps in this manner a large effective lever arm is obtained and the maximum moment is produced. The clamps are thus particularly effective in withstanding the turning moment of the frame and in securing the same to the pedestal.

The present invention provides for readily adjusting the relative angular positions of the pedestal and the frame through the medium of one of the clamping devices. The adjusting mechanism is likewise located the maximum distance from the pivot point whereby a particularly fine adjustment may be obtained.

The clamping means and the adjustment have been particularly shown as applied to a frame for motion picture machines, but it is apparent that they may be applied to other devices and particularly to any device which is subjected to vibrations.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with an apparatus having an element that vibrates about a horizontal axis, a supporting pedestal therefor, a frame carrying said element, said frame being pivotally mounted on said pedestal for movement about the axis of said vibrating element whereby the vibrating element is supported directly by said pedestal and the vibrations thereof are not imparted to said frame, said frame extending substantially above and below said pivot point, said pedestal having a member extending above said pivot point in clamping engagement with said frame and an additional clamping member carried by said pedestal below said pivot point and in engagement with the lower portion of said frame, said clamping means being widely spaced from said vibrating element whereby a substantial leverage is obtained for rigidly securing said frame.

2. In a machine having an element that vibrates about a horizontal axis, a supporting pedestal, a frame carrying said element and pivotally mounted on said pedestal for movement about the axis of said element whereby said element is directly supported by said pedestal and the vibrations thereof are prevented from being transmitted to said frame, and an adjusting mechanism comprising a shaft journalled in said pedestal and having a gear engaging a rack carried on the lower portion of said frame, and clamping means comprising a member journalled in said frame and extending through an arcuate slot located in the upper of said pedestal a substantial distance above said pivot point, whereby a substantial leverage is obtained for rigidly securing said frame to said pedestal and preventing vibration thereof.

3. In a machine having an element that vibrates about a horizontal axis, a supporting pedestal, a frame carrying said element and pivotally mounted on said pedestal for movement about an axis passing through said element, an adjusting mechanism comprising a shaft journalled in said pedestal and having a gear engaging a rack carried on the lower portion of said frame, clamping means comprising a member journalled in said frame and extending through an arcuate slot located in the upper portion of said pedestal a substantial distance above said pivot point, and means for clamping said adjusting mechanism whereby the frame is clamped to the pedestal at spaced points and at points widely separated from the pivot, so that a substantial leverage is obtained for preventing vibration of the same.

4. A support for a machine having mechanism including movable parts that are inherently a series of vibrations, said support comprising a frame having a housing formed therein, said vibratable mechanism being mounted to move within said housing, a supporting pedestal for said frame having a complimentary housing pivotally supporting said first-mentioned housing, said frame extending substantially above and below said housings, said pedestal having a member extending above said housings, clamping means carried by said extending member for engaging said frame at a point remote from said housings, a second clamping member carried by said pedestal and engaging said frame at a lower portion thereof, one of said clamping means including means for causing relative pivotal movement between said frame and said pedestal whereby relatively fine angular adjustment of said frame may be obtained, the arrangement being such that the vibrations of said vibratable element are transmitted directly to the pedestal thereby substantially eliminating any transfer of said vibrations to said frame, said spaced clamping means having substantial lever arms with respect to said housings whereby increased rigidity of said frame is obtained and the vibration thereof is substantially eliminated.

5. A support for a machine having mechanism including rotating parts that are inherently a source of vibration, said support comprising a frame having a cylindrical housing formed therein, said vibratable mechanism being mounted within said housing with its axis coinciding with the axis of said housing, a supporting pedestal for said frame having a cylindrical housing wherein said first mentioned housing is journalled for pivotal movement, said frame extending substantially above and below said pivot point, said pedestal having a member extending above said pivot point and clamping means carried by said last mentioned member for engaging said frame at a point remote from said pivot point, a second clamping member carried by said pedestal and engaging said frame at the lower portion thereof and at a point opposite said first mentioned clamping means, said last mentioned clamping means including means for causing relative pivotal movement between said frame and said pedestal whereby angular adjustment of said frame may be obtained, the arrangement being such that the vibrations of said vibratable element are transmitted directly to said pedestal thereby substantially eliminating any transfer of said vibrations to said frame, said spaced clamping means having substantial lever arms with respect to said pivot point whereby increased rigidity of said frame is obtained and vibration thereof is substantially eliminated.

AUGUSTO DINA.